Feb. 27, 1934.   E. M. WILSON   1,949,032
COTTON PICKING MACHINE
Filed April 8, 1930   5 Sheets-Sheet 1

Inventor
Ernest M. Wilson
By Milans & Milans
Attorneys

Feb. 27, 1934.  E. M. WILSON  1,949,032
COTTON PICKING MACHINE
Filed April 8, 1930   5 Sheets-Sheet 2

Inventor
Ernest M. Wilson
By Milans & Milans
Attorneys

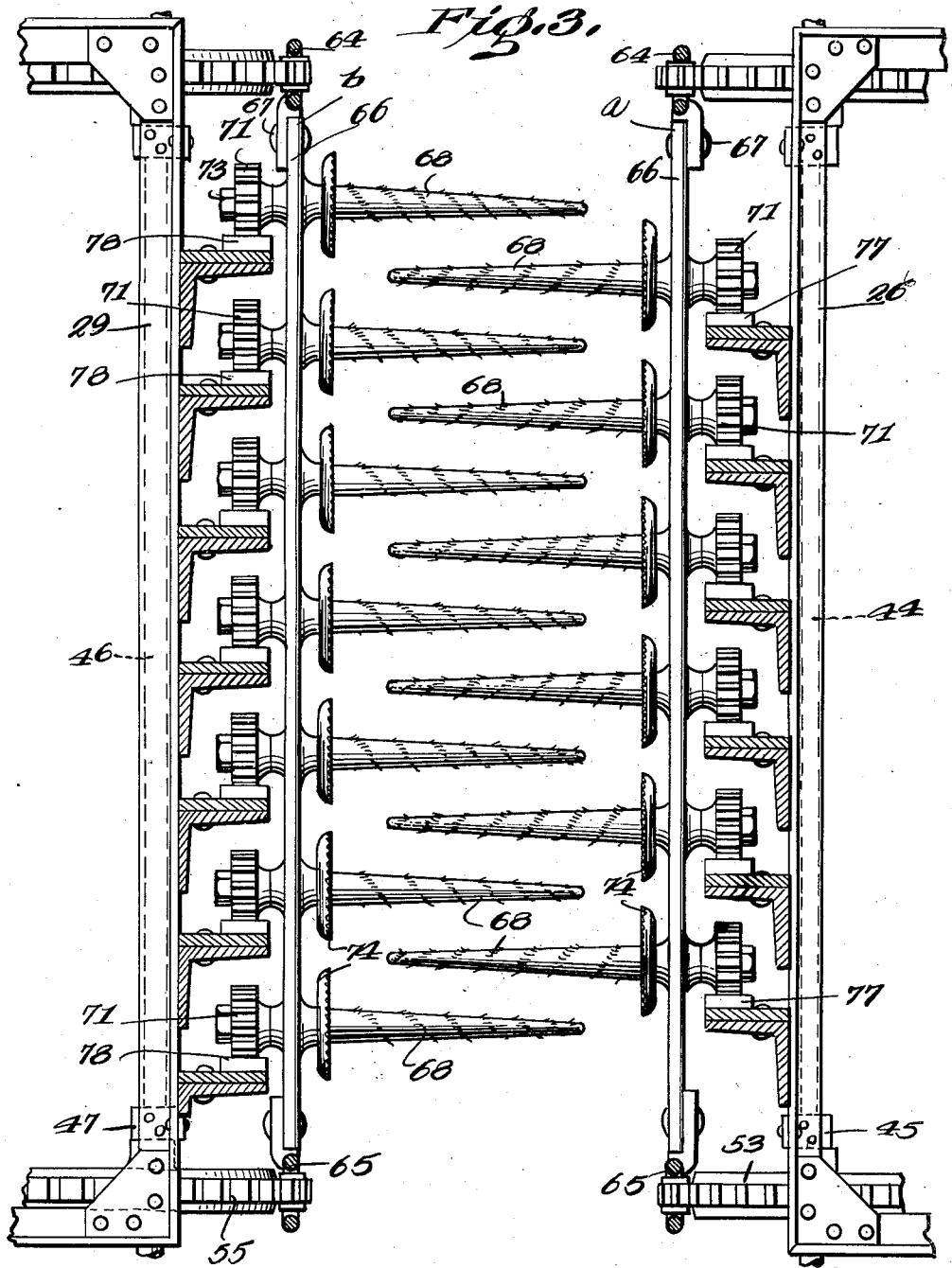

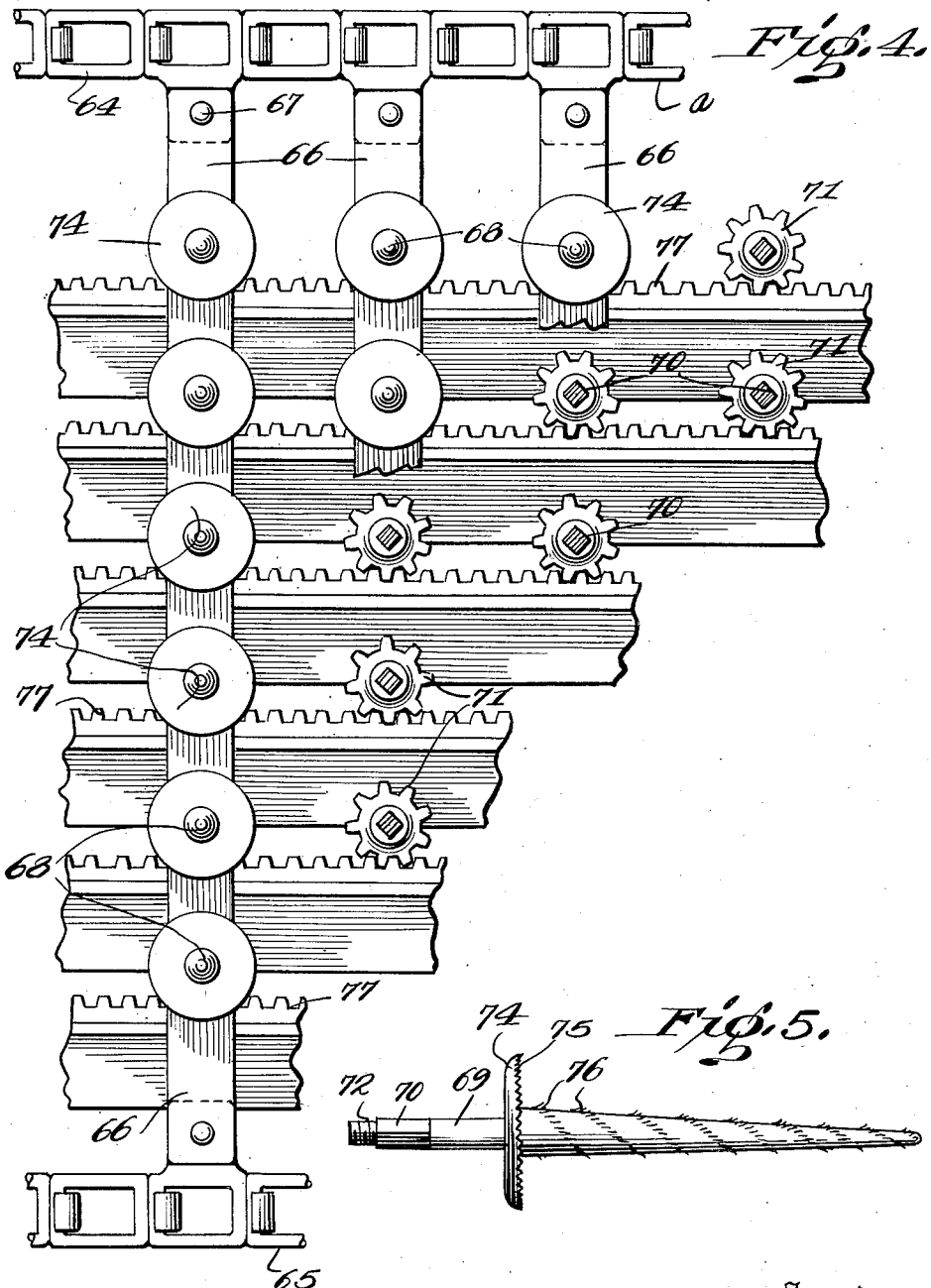

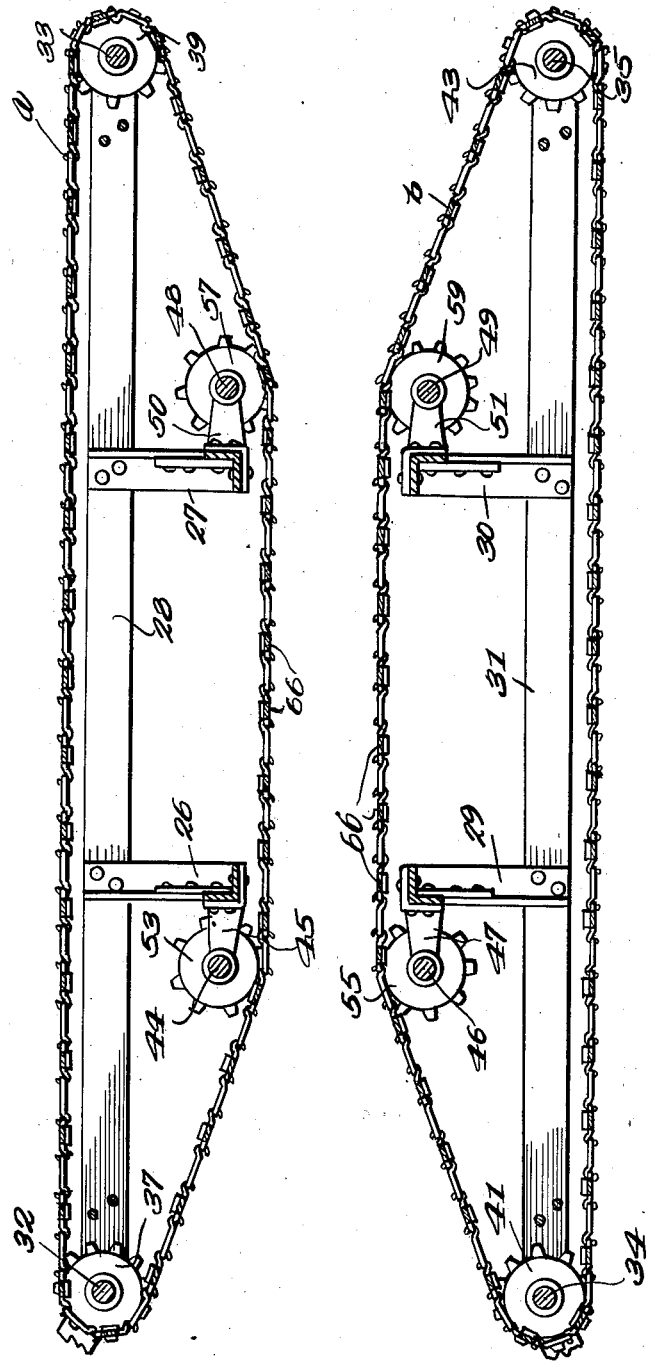

UNITED STATES PATENT OFFICE 1,949,032

COTTON PICKING MACHINE

Ernest Martin Wilson, Fort Worth, Tex., assignor of thirty per cent to Elgan H. Carlton and thirty per cent to Al A. Carlton, both of Fort Worth, Tex.

Application April 8, 1930. Serial No. 442,568

5 Claims. (Cl. 56—42)

My invention relates to new and useful improvements in a cotton picking machine and has for its principal object the provision of a machine of the character described which may be either horse drawn or motor driven and adapted to travel down a single row and remove or pick the cotton from the burrs, only the seed cotton being removed free from trash and dirt, leaving the stalks, green boles, squares and leaves intact and undamaged, the removed seed cotton being conveyed to a suitable container or receptacle from which it may be later removed.

Another object of the invention resides in the provision of endless members or conveyers operated from the movement of the machine, these endless members or conveyers moving on opposite sides of the row of stalks and carrying spindles which are rotated to engage and remove the cotton from the burrs, the operation of the endless members being so timed that they travel towards the rear of the machine at the same speed that the machine is traveling forward thereby making any point between the ends of the members stationary.

Still another object of the invention consists in forming the cotton picking or removing spindles with a plurality of barbs or pointed projections arranged spirally and providing each spindle, adjacent its rear or inner end, with a flange also provided on a forwardly extending edge with barbs or pointed projections to aid in the removal of the cotton from the burrs.

Another object of the invention resides in the provision of means for removing the cotton from the spindles and conveying the same to a suitable container or receptacle, carried by the machine, and from which it may in turn be removed when the desired point has been reached.

With the above and other objects in view, which will appear as the description proceeds, my invention consists in the novel details of construction and arrangement of parts described in the following specification and illustrated in the accompanying drawings, and while I have illustrated and described the preferred embodiments of the invention, as they now appear to me, it will be understood that such changes may be made as will fall within the scope of the appended claims.

In the drawings:—

Fig. 3 is an enlarged section on the line 3—3 of Fig. 2 looking in the direction of the arrows.

Fig. 4 is a fragmental face view of one of the endless members carrying the picking spindles with certain parts shown in section.

Fig. 5 is a detail of one of the picking spindles.

Fig. 6 is a fragmental section on the line 6—6 of Fig. 2 looking in the direction of the arrows; and Fig. 7 is a horizontal section on the line 7—7 of Fig. 1 looking in the direction of the arrows.

Figure 1:
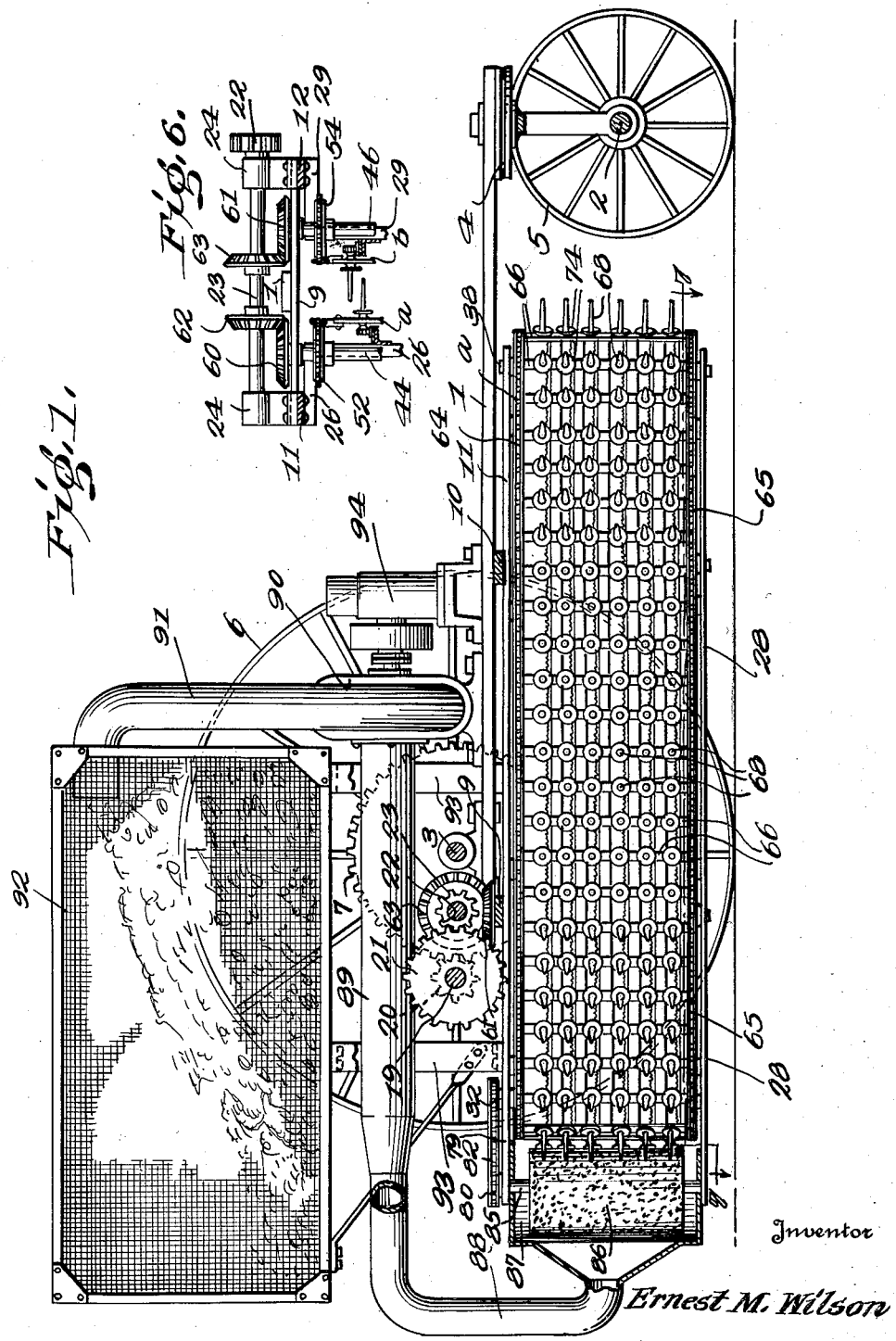
Fig. 1 is a longitudinal vertical section through the machine with parts shown in side elevation.
Figure 2:
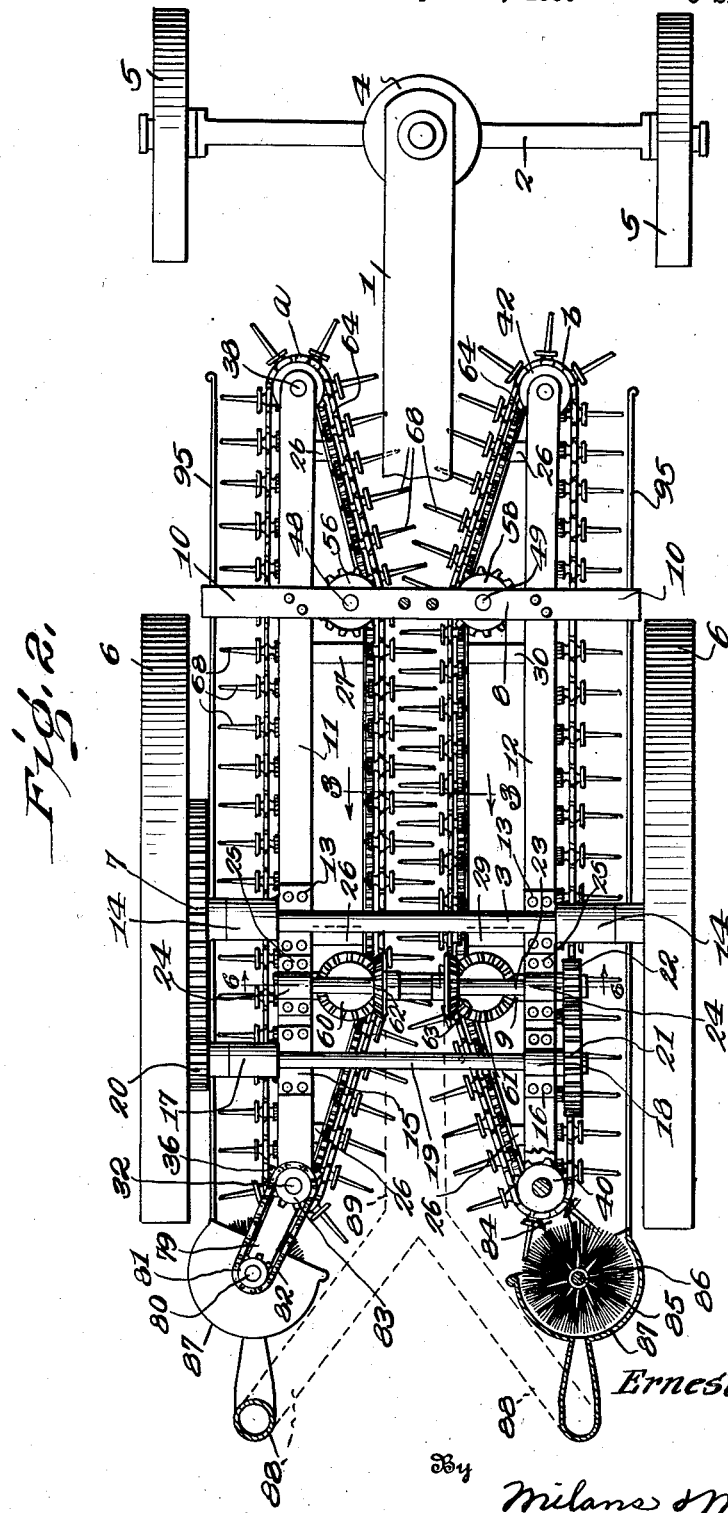
Fig. 2 is a top plan, with parts removed, showing in detail the mechanism or endless members for removing or picking the cotton.

As stated in the objects of the invention my machine may be either horse drawn or motor driven. In the drawings 1 indicates a longitudinally extending beam supported at its forward end by the front axle 2 and suspended adjacent its rear end from the rear axle 3. A "fifth" wheel construction is shown at 4 whereby the front axle 2 may turn for guiding and carried by the front axle are the wheels 5. Wheels 6 support the rear axle 3 and secured to the inner face of one of the rear wheels 6 is a gear wheel 7 for a purpose to be later described. Secured to the under face of the beam 1, and extending transversely thereof, are the longitudinally spaced transversely extending bars 8 and 9, the ends 10 of the bar 8 extending outwardly for a greater distance than the ends of the bar 9 for a purpose which will be later described. Secured to and supported by the transversely extending bars 8 and 9 are the longitudinally extending transversely spaced bars 11 and 12 and secured to the upper face of each of these longitudinally extending bars is a plate 13 having a bearing portion 14 through which the rear axle 3 extends. Also secured to the upper faces of the bars 11 and 12 are the plates 15 and 16 formed with the bearing portions 17 and 18 respectively, for the transversely extending shaft 19 having the gear wheel 20 secured at one end and the gear wheel 21 secured at the opposite end. The gear wheel 20 meshes with the gear wheel 7 secured to the wheel 6 and the gear wheel 21 meshes with a gear wheel 22 secured to one end of the transversely extending shaft 23 supported in the bearing portions 24 of the plates 25 secured to the upper faces of the longitudinally extending bars 11 and 12. It will thus be seen that as the wheels 6 rotate with the gear 7 that the gear 7 meshing with the gear 20 rotates the shaft 19 and the rotation of this shaft 19 rotates the shaft 23 through means of the intermeshing gears 21 and 22. Secured to the bar 11, by means of the brackets 26 and 27, and extending parallel therewith is a lower longitudinally extending bar 28 and secured to the bar 12, by means of the brackets 29 and 30, and extending parallel therewith, is a lower longitudinally extending bar 31. Vertically extending shafts 32 and 33 are supported between the bars 11 and 28, at opposite ends thereof, and vertically extending shafts 34 and 35 are mounted between the bars 12 and 31 adjacent the opposite ends thereof. The shaft 32 carries the vertically spaced sprocket wheels 36 and 37, the shaft 33 carries the vertically spaced sprocket wheels 38 and 39, the shaft 34 carries the vertically spaced sprocket wheels 40 and 41 and the shaft 35 carries the vertically spaced sprocket wheels 42 and 43. Extending through the transversely extending bar 9 is a vertically extending shaft 44, the lower end of which is supported in a bearing bracket 45, secured to the bracket 26, as shown more particularly in Fig. 7 of the drawings. Also extending through the transversely extending bar 9 and transversely spaced from the shaft 44, is a vertically extending shaft 46, the lower end of which is supported in the bearing bracket 47 secured to the bracket 9. Extending through the transversely extending bar 8, and transversely spaced one relative to the other, are the vertically extending shafts 48 and 49, the lower ends of these shafts being supported, respectively, in bearing brackets 50 and 51, secured respectively to the brackets 27 and 30. Carried by the shaft 44 are the vertically spaced sprocket wheels 52 and 53. Carried by the shaft 46 are the vertically spaced sprocket wheels 54 and 55. Carried by the shaft 48 are the vertically spaced sprocket wheels 56 and 57 carried by the shaft 49 are the vertically spaced sprocket wheels 58 and 59. Carried by the shafts 44 and 46, respectively, above the upper sprocket wheels 52 and 54 are the beveled gears 60 and 61 meshing respectively with the beveled gears 62 and 63 carried by the shaft 23, as shown more particularly in Figs. 2 and 6 of the drawings.

The picking spindles or members are carried by endless conveyors of which there are two indicated generally at a and b, these conveyors operating longitudinally of the machine. As each of the conveyors are of similar construction a description of one will suffice for both. Each of the conveyors consists of an upper endless chain 64 and a lower endless chain 65 connected by vertically extending longitudinally spaced bars 66. Certain of the links forming part of the chains 64 and 65 are provided with lugs to which the bars 66 are connected by means of rivets 67 or other suitable fastenings. Each of the vertically extending bars 66 carries a plurality of vertically spaced horizontally extending tapered picking spindles or members 68, of the construction shown more particularly in Fig. 5 of the drawings, and these spindles or members are adapted to be rotated in a manner to be later described. Each of the spindles 68 is formed at one end with a round portion 69, which extends through the bars 66, a square portion 70 to receive a gear 71, and a threaded portion 72 to receive a nut 73. As shown more particularly in Fig. 3 of the drawings the gears 71 will be positioned adjacent the inner faces of the bar 66 and the spindles are formed with a concaved shoulder or flange 74 which will be positioned adjacent the outer face of the bars 66. The edges of the flanges or shoulders 74 are provided with the teeth or barbs 75 to engage the cotton to aid in removing the same from the burrs. The tapered portions of the spindles are formed with the spirally arranged barbs or pointed projections 76 which also engage the cotton to aid in removing the same from the burrs.

The upper chain 64, of the conveyor a, will be trained and operate around the upper sprocket wheels 36, 52, 56 and 38 carried by the shafts 32, 44, 48 and 32, respectively, whereas the lower chain of the conveyor a will operate around the sprocket wheels 37, 53, 57 and 39 carried by the same series of shafts. The upper chain of the conveyor b will be trained and operate around the upper sprocket wheels 40, 54, 58 and 42 carried respectively by the shafts 34, 46, 49 and 35 while the lower chain of this conveyor b will be trained and operate around the lower sprocket wheels 41, 55, 59 and 43 carried by the same series of shafts.

From the arrangement of the sprocket wheels around which the conveyors operate it will be seen that the intermediate portions of the conveyors extend parallel with a longitudinally extending space between the chains and connecting bars of the conveyors, as shown more particularly in Fig. 7 of the drawings, while the inner flights of the conveyor extend outwardly at an angle at each end to provide widened portions between the conveyors at the ends to allow the stalks to properly pass into the space formed by the parallel extending portions and to pass therefrom. As illustrated more particularly in Fig. 3 of the drawings the spindles carried by the conveyers are horizontally arranged and the spindles carried by each of the bars 66 vertically spaced. As an example I have illustrated, in the drawings, six spindles carried by each of the bars 66 of the conveyor a and seven spindles carried by each of the bars 66 of the conveyor b, but, of course, I do not desire to be limited to the specific number of spindles shown. The spindles of the conveyers will be staggered, as shown more particularly in Figs. 2 and 3 of the drawings so that the spindles of one conveyer will be on different vertical planes than the spindles carried by the other conveyer and the spindles of one conveyer will also be longitudinally spaced relative to the spindles of the other conveyer.

Supported by the brackets 26 and 27 are the longitudinally extending vertically spaced gear racks 77 and supported by the brackets 29 and 30 are the longitudinally extending vertically spaced gear racks 78. As shown more particularly in Fig. 3 of the drawings the gear racks carried by the brackets 26 and 27 are staggered with relation to the racks 78 carried by the brackets 29 and 30. The racks 77 and 78 are adapted to be engaged by the gears 71 on the spindles 66 so as to rotate the spindles during movement of the conveyers. As shown more particularly in Fig. 2 of the drawings the racks are of a shape or formation corresponding to the shape of the inner flights of the conveyer or in other words the ends of the racks are outwardly flared or inclined.

Each of the longitudinally extending parallel bars 11 and 28 is provided with an outwardly directed extension 79 on their rear end and supported between these extensions is a vertically extending shaft 80 having a sprocket wheel 81 secured at its upper end, a sprocket chain 82 operating around the sprocket wheel 81 and a sprocket wheel 83 carried by the shaft 32. Each of the longitudinally extending parallel bars 12 and 31 is provided with an outwardly directed extension 84 on their rear end and supported between these extensions is a vertically extending shaft 85 having a sprocket wheel at its upper end corresponding to the sprocket wheel 81 carried by the shaft 80 and a sprocket chain, not shown, similar to the sprocket chain 82 operates around this gear and around a gear carried by the shaft 39 similar to the gear 83 carried by the shaft 32. Carried by each of the shafts 80 and 85 is a brush 86 adapted to engage and wipe the cotton from the spindles 68. This is shown more particularly in Fig. 2 of the drawings. Partially surrounding each of the brushes 86 is a housing 87 to each of which leads a branch pipe 88 of a suction conveyer. These branch pipes 88 communicate with a pipe 89 leading to a fan housing 90 in which operates a fan for creating suction to draw the cotton, removed from the spindles by the brushes, through the branch pipes 88 and the pipe 89. The cotton sucked through the pipe 89 is discharged by the fan through a pipe 91 into a receptacle 92 supported by the brackets 93. The fan is operated through means of a motor indicated generally at 94. Extending from one edge of each of the housings 87, and extending longitudinally of the machine, as shown more particularly in Fig. 2 of the drawings, is a guard plate 95 which is positioned between the rear wheels of the vehicle and the outer flights of the conveyers.

From the above detail description it is thought that the construction and operation of my machine will be readily apparent. As previously stated the entire machine may be either horse drawn or motor driven and it will operate along a single row of cotton at a time. As the machine is propelled the cotton stalks will be directed between the forwardly flared ends of the conveyers and pass between the parallel portions thereof. The picking spindles being rotated, by the gears carried thereby engaging the gear racks, will remove the seed cotton from the burrs. It will be understood that the cotton is engaged by the barbs or pointed projections arranged spirally of the spindles and also by the teeth or pointed projections formed on the flange of each spindle. The stalks leave the conveyers through the rearward flared ends thereof and with my construction the stalks are not damaged in any way. As the spindles, carrying the seed cotton, reach the rear of the machine the cotton is removed from the spindles by engagement of the brushes 86 and then the cotton in turn will be removed from the brushes due to the suction of the fan and delivered into the receptacle 92. The cotton may be removed from the receptacle when the desired point is reached. As has also been previously described the gearing of the conveyers is so timed that they will be operated in a rearward direction at the same speed that the machine is moving forward thereby making a stationary point between the ends of the parallel portion of the conveyers so that the burrs of the individual stalks will be continually operated upon by the same picking spindles. My machine is of relatively simple construction and will remove or pick the seed cotton from the burrs, free from trash and dirt, convey the same to the receptacle, and leave the stalks, green boles, squares and leaves intact and undamaged.

Having fully described my invention what I claim as new and desire to secure by Letters Patent is:—

1. A cotton picker including a supporting structure, an endless conveyer carried by the supporting structure, picking members carried by the conveyer, and a rotatable brush positioned at the end of the conveyer for wiping the picking members as the conveyer is operated, said brush including a solid mass of bristles and the picking members passing directly through the mass.

2. A cotton picker including a supporting structure, an endless conveyer carried by the supporting structure, picking members carried by the conveyer, and an elongated brush rotatable on a vertical axis and positioned at the end of the conveyer for wiping the picking members as the conveyer is operated, said brush including a solid mass of bristles and the picking members passing directly through the mass.

3. A cotton picking machine comprising ground wheels, an axle, a pair of opposed frame members suspended from said axle, each of said frame members embodying a pair of vertically spaced longitudinally disposed bars and a pair of inwardly directed brackets attached to each of said bars at equally spaced points inwardly of the ends of said bars, sprocket wheels journaled in the forward and rear ends of the bars, intermediate sprocket wheels carried by the brackets and journaled at points laterally spaced from the bars and out of longitudinal alignment with respect to the first named sprocket wheels, a pair of opposed endless conveyers on said sprocket wheels to travel first in a converging direction between the forward sprocket wheels and one of the intermediate sprocket wheels, then parallel between the sets of intermediate sprocket wheels and then in a diverging direction toward the rear sprocket wheels, and picking members carried by said conveyers.

4. A cotton picking machine comprising ground wheels, an axle, a pair of opposed frame members suspended from said axle, each of said frame members embodying a pair of vertically spaced longitudinally disposed bars and a pair of U-shaped brackets attached at their free ends to said bars at equally spaced points inwardly of the ends of said bars, the closed portion of each bracket being directed toward a companion bracket of the other frame member, sprocket wheels journaled in the forward and rear ends of the bars, intermediate sprocket wheels carried by the brackets and journaled at points laterally spaced from the bars and out of longitudinal alignment with respect to the first named sprocket wheels, a pair of opposed endless conveyers trained on said sprocket wheels to travel first in a converging direction between the forward sprocket wheels and one of the intermediate sprocket wheels, then parallel between the sets of intermediate sprocket wheels and then in a diverging direction toward the rear sprocket wheels, and picking members carried by said conveyers.

5. A cotton picking machine comprising ground wheels, an axle, a pair of opposed frame members suspended from said axle, each of said frame members embodying a pair of vertically spaced longitudinally disposed bars and a pair of U-shaped brackets attached at their free ends to said bars at equally spaced points inwardly of the ends of said bars, the closed portion of each bracket being directed toward a companion bracket of the other frame member, sprocket wheels journaled in the forward and rear ends of the bars, intermediate sprocket wheels carried by the brackets and journaled at points laterally spaced from the bars and out of longitudinal alignment with respect to the first named sprocket wheels, a pair of opposed endless conveyers trained on said sprocket wheels to travel first in a converging direction between the forward sprocket wheels and one of the intermediate sprocket wheels, then parallel between the sets of intermediate sprocket wheels and then in a diverging direction toward the rear sprocket wheels, picking members carried by said conveyers, extensions directed rearwardly from the bars, vertically disposed rotary brushes journaled in said extension to the rear of said conveyers and in the path of the picking members and casings for said brushes.

ERNEST MARTIN WILSON.